United States Patent [19]
Hogan

[11] Patent Number: 5,615,815
[45] Date of Patent: Apr. 1, 1997

[54] STORAGE RACK FOR AN AUTOMOTIVE ANTI-THEFT DEVICE

[76] Inventor: Christopher M. Hogan, 273 77th St., Brooklyn, N.Y. 11209

[21] Appl. No.: 478,786

[22] Filed: Jun. 7, 1995

[51] Int. Cl.⁶ ........................................ B60R 7/00
[52] U.S. Cl. .................. 224/571; 224/539; 224/545; 248/309.1; 211/60.1
[58] Field of Search .................. 224/324, 539, 224/545, 567, 569, 571, 541; 211/60.1, 62, 63, 64, 68, 70.2, 70.7, 70.8; 248/309.1, 300

[56] References Cited

U.S. PATENT DOCUMENTS

| | | |
|---|---|---|
| 1,013,662 | 1/1912 | Kramer .................................. 211/62 |
| 1,204,813 | 11/1916 | Murray . |
| 1,483,666 | 2/1924 | Kovarik ................................ 211/63 |
| 2,634,031 | 4/1953 | Klein . |
| 3,273,769 | 9/1966 | Miller .................................. 224/567 |
| 3,294,247 | 12/1966 | Norrington ........................... 224/567 |
| 3,491,893 | 1/1970 | Morris . |
| 3,706,403 | 12/1972 | Sikes ................................... 224/571 |
| 3,848,786 | 11/1974 | Baxter .................................. 224/571 |
| 4,029,078 | 6/1977 | Eller . |
| 4,364,499 | 12/1982 | McCue ................................. 224/569 |
| 4,579,263 | 4/1986 | Ehmke ................................. 224/539 |
| 5,129,563 | 7/1992 | Dillon .................................. 224/569 |

FOREIGN PATENT DOCUMENTS 560359  10/1923  France .................................. 211/62

Primary Examiner—Henry J. Recla
Assistant Examiner—Gregory M. Vidovich
Attorney, Agent, or Firm—Michael I. Kroll

[57] ABSTRACT

A storage rack for an automotive anti-theft device, comprising a framework for holding the automotive anti-theft device. A structure is for retaining the framework to a stationary surface, to retain the automotive anti-theft device.

9 Claims, 2 Drawing Sheets

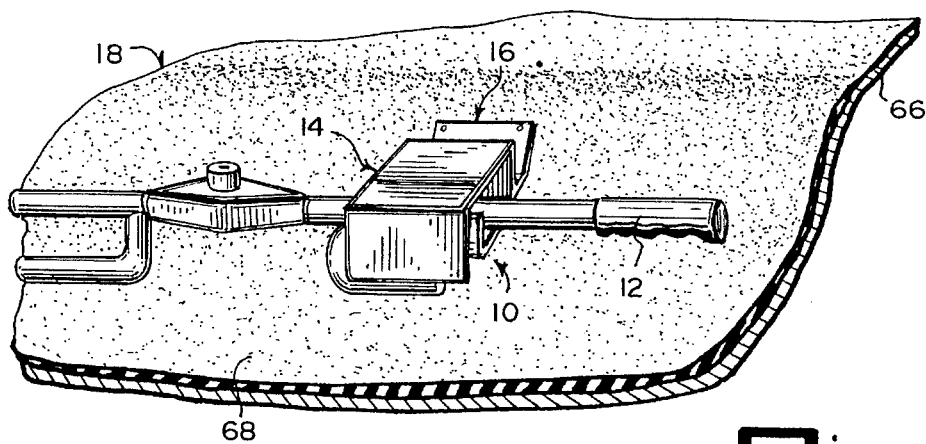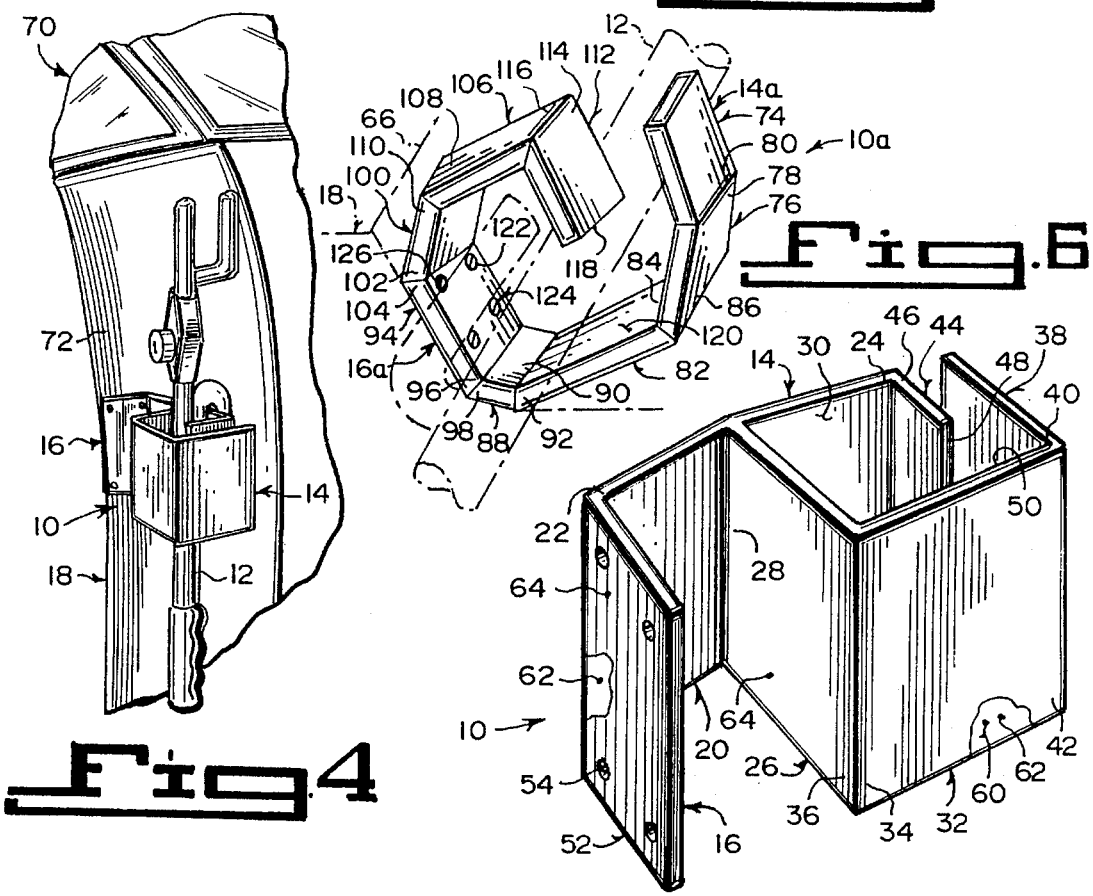

STORAGE RACK FOR AN AUTOMOTIVE ANTI-THEFT DEVICE

BACKGROUND OF THE INVENTION

1. Field of the Invention

The instant invention relates generally to support structures and more specifically it relates to a storage rack for an automotive anti-theft device.

2. Description of the Prior Art

Numerous support structures have been provided in prior art. For example, U.S. Pat. No. 1,204,813 to Murray; U.S. Pat. No. 2,634,031 to Klein; U.S. Pat. No. 3,491,893 to Morris and U.S. Pat. No. 4,029,078 to Eller all are illustrative of such prior art. While these units may be suitable for the particular purpose to which they address, they would not be as suitable for the purposes of the present invention as heretofore described.

MURRAY, ROLAND J.

Locking Rack for Indian Clubs and the Like

U.S. Pat. No 1,204,813

An Indian club rack comprising, a bar adapted to be secured to a wall and is provided with a plurality of U-shaped slots in its outer edge. Blocks slideably mounted on the under face thereof and provided with L-shaped slots in their outer edges are adapted to cooperate with the U-shaped slots. The blocks being further provided with longitudinal slots near their ends. Pins are secured through the bar and passed through the slots and beaded. Washers are secured on the pins beneath the blocks. A lock is carried by the inner end of one of the blocks. A locking plate is carried in the inner end of the other blocks.

KLEIN, MORRIS W.

Multiple Tie Rack

U.S. Pat. No. 2,634,031

A utility rack forming part of a coat hanger having a horizontal bar portion, comprising a pair of laterally spaced limbs depended vertically from the bar portion at points midway between the center and the outer ends of the horizontal bar portion. Horizontal arms are supported intermediate of their ends on the bottom ends of the limbs and extend parallel to the bar portion. The horizontal arms being end aligned and each of a length slightly less than one-half the length of the horizontal bar portion leaving a space between the adjacent inner ends of the horizontal arms. Spaced teeth extend upward from the arms on opposite sides of the limbs and extend parallel to the limbs. The teeth being shorter than the limbs provide a clearance between the tow ends of the teeth and the horizontal bar.

MORRIS, CHARLES L.

Stemware Bracket

U.S. Pat. No. 3,491,893

A two part bracket, for supporting stemware from the inside of a hinged cabinet door, has a plurality of slots to slideably receive the ware in sockets defined at spaced locations along each of the slots. Both bracket parts are made from a plastic material and these parts are similar top and bottom and therefore reversible for use on either left, or right-hand opening, doors. The slots extend radially inwardly from an outer partially arcuate edge of the bracket toward a vertex or corner adjacent the hinged edge of the door. One of the bracket parts can be used alone on narrower cabinet doors, and both parts can be interlocked for use on a somewhat wider door.

ELLER, ROBERT E.

Andiron for Controlled Burning of Logs

U.S. Pat. No. 4,029,078

An andiron comprising four corner posts and upper and lower sets of horizontal log support bars. The lower bars are continuous and are adapted to support a plurality of logs in a horizontal position above a floor of a fireplace. One of the upper bars is continuous and the other is open at its center. The open centered bar has two end portions, each of which is adapted to support at least one log in a horizontal position above the lower logs. The open center permits one or more additional logs to be placed diagonally, with the lower ends thereof on the lower set of logs and the opposite ends on the continuous upper support bar. The sloping attitude of the additional logs facilitates both its ignition and the ignition of the upper set of logs. As the logs burn they eventually break at their centers and fall downwardly into the confines of the andiron, usually into diagonal positions with their outer ends supported on one of the cross members.

SUMMARY OF THE INVENTION

A primary object of the present invention is to provide a storage rack for an automotive anti-theft device that will overcome the shortcomings of the prior art devices.

Another object is to provide a storage rack for an automotive anti-theft device that will hold the automotive anti-theft device in a safe place in a motor vehicle when not in use.

An additional object is to provide a storage rack for an automotive anti-theft device, in which the convenient location of the storage rack installed with the motor vehicle will allow for easy insertion and removal of the automotive anti-theft device from the storage rack.

A further object is to provide a storage rack for an automotive anti-theft device that is simple and easy to use.

A still further object is to provide a storage rack for an automotive anti-theft device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is a perspective view similar to FIG. 2, with the automotive anti-theft device held in place horizontally by the instant invention.

FIG. 4 is a perspective view showing the instant invention mounted to an interior side panel of the motor vehicle with the automotive anti-theft device held in place vertically.

FIG. 5 is an enlarged perspective view of the instant invention per se before installation.

FIG. 6 is a perspective view of a second embodiment of the instant invention mounted to the passenger side of the transmission hump on the floor carpet in a motor vehicle.

Similar reference characters denote corresponding features consistently throughout the attached drawings.

DETAILED DESCRIPTION OF THE PREFERRED EMBODIMENTS

Figure 1:
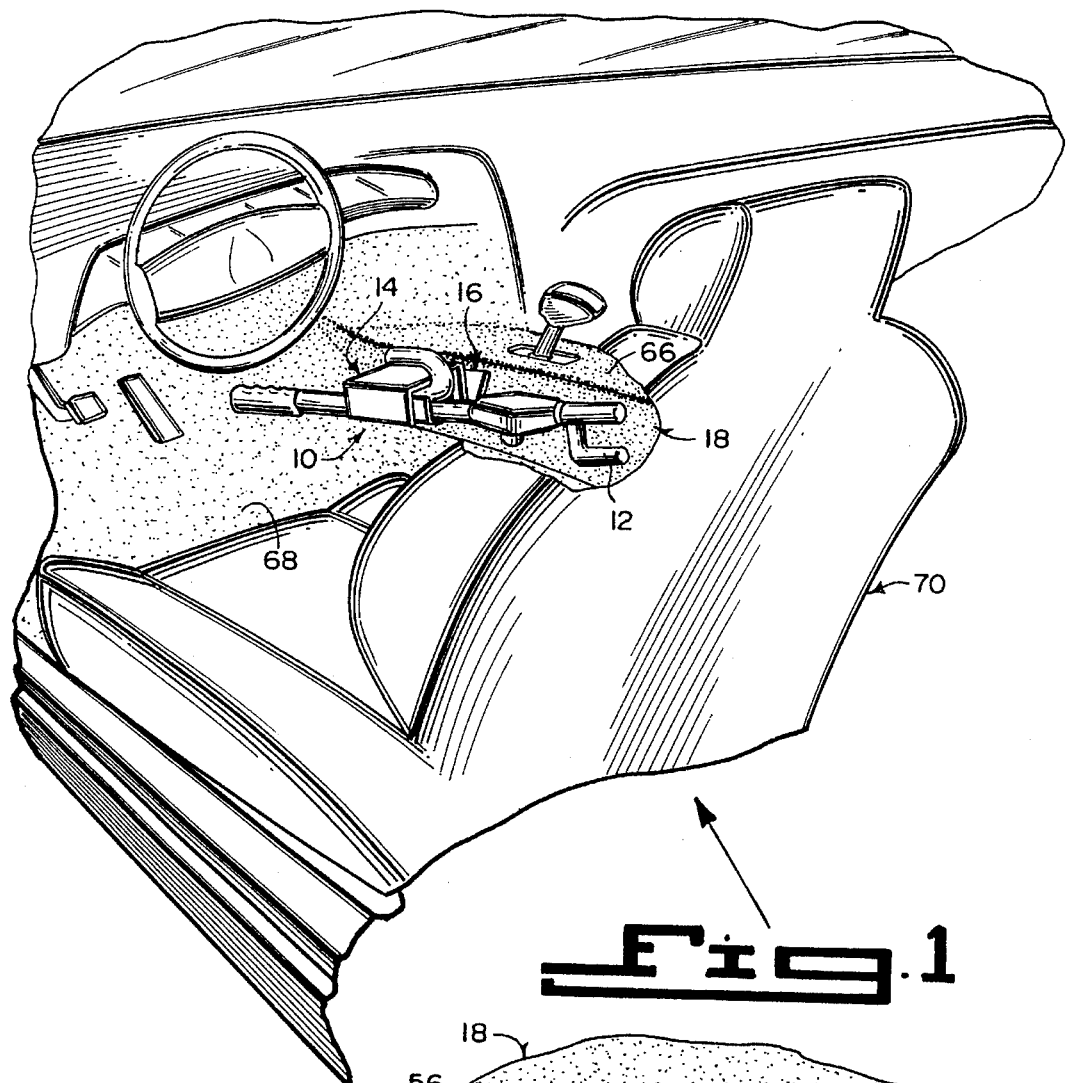
FIG. 1 is a perspective view of a motor vehicle with parts broken away, showing the instant invention mounted therein, holding an automotive anti-theft device in a safe place when not in use.

Turning now descriptively to the drawings, in which similar reference characters denote similar elements throughout the several views, FIGS. 1 through 6 illustrate a storage rack 10 for an automotive anti-theft device 12, comprising a framework 14 for holding the automotive anti-theft device 12. A structure 16 is for retaining the framework 14 to a stationary surface 18.

The framework 14 in FIGS. 1 through 5, includes a first panel 20 having a first end 22 and a second end 24. A second panel 26 depends at a right angle on its first end 28 from a side 30 of the first panel 20 midway between the first end 22 and the second end 24 of the first panel 20. A third panel 32 is supported at a right angle on its first end 34 from a second end 36 of the second panel 26. The third panel 32 is of a length longer than half the length of the first panel 20 and extends parallel to the first panel 20. A fourth panel 38 extends at a right angle on its first end 40 from a second end 42 of the third panel 32. The fourth panel 38 is of equal length to the second panel 26 and extends parallel to the second panel 26. A fifth panel 44 projects at a right angle on its first end 46 from the second end 24 of the first panel 20. The fifth panel 44 is of a length shorter than the second panel 26 and the fourth panel 38. The fifth panel 44 extends parallel to and between the second panel 26 and the fourth panel 38. This leaves a clearance space between a second end 48 of the fifth panel 44 and a side 50 of the third panel 32, to allow the automotive anti-theft device 12 to be inserted therein.

The retaining structure 16 in FIGS. 1 through 5, consists of a mounting plate 52 angularly affixed to the framework 14. The mounting plate 52 has a plurality of holes 54 therethrough. A plurality of fasteners 56 are provided. Each fastener 56 extends through one hole 54 in the mounting plate 52 and into the stationary surface 18, so as to secure the mounting plate 52 with the framework 14 to the stationary surface 18. Each fastener 56 is a screw 58. The fasteners 56 can also be bolts, nails or rivets to retain the mounting plate 52 to the stationary surface 18.

The framework 14 is fabricated out of a strong durable material 60. The strong durable material 60 is a thin gauge metal 62 coated with an elastic substance 64, such as rubber or soft plastic, to prevent harm to both a person and the automotive anti-theft device 12. The retaining structure 16 is also made out of the thin gauge metal 62 and is also coated with the elastic substance 64, to prevent harm to both a person and the automotive anti-theft device 12. The first panel 20, the second panel 26, the third panel 32, the fourth panel 38, the fifth panel 44 and the mounting plate 52 are integral to each other and are of the same width, so as to form one complete whole unit.

The storage rack 10a in FIG. 6, is a second embodiment in which the framework 14a includes a first panel 74. A second panel 76 depends obliquely inward at a first end 78 from a first end 80 of the first panel 74. A third panel 82 is supported at a first end 84 from a second end 86 of the second panel 76, so that the third panel 82 is at a right angle to the first panel 74. A fourth panel 88 extends obliquely outward at a first end 90 from a second end 92 of the third panel 82. A fifth panel 94 projects at a first end 96 from a second end 98 of the fourth panel 88. The fifth panel 94 is parallel to the first panel 74. A sixth panel 100 depends obliquely inward at a first end 102 from a second end 104 of the fifth panel 94. A seventh panel 106 is supported at a first end 108 from a second end 110 of the sixth panel 100. The seventh panel 106 is parallel to the third panel 82. An eight panel 112 projects at a fist end 114 at a right angle from a second end 116 of the seventh panel 106. The eighth panel 112 is parallel to and between the first panel 74 and the fifth panel 94. This leaves a clearance space between a second end 118 of the eight panel 112 and a side 120 of the third panel 82, to allow the automotive anti-theft device 12 to be inserted therein.

The retaining structure 14a in FIG. 6, consists of the fifth panel 94 having a plurality of holes 122 therethrough. A plurality of fasteners 124 are provided. Each fastener 124 extends through one hole 122 in the fifth panel 94 and into the stationary surface 18, so as to secure the fifth panel 94 of the framework 14a to the stationary surface 18.

Each fastener 124 is a screw 126. The fasteners 124 can also be bolts, nails or rivets to retain the fifth panel 94 to the stationary surface 18, which can be on the passenger side of the transmission hump 66.

The automotive anti-theft device 12 can be "The Club", cane type and numerous other types of locking devices. They can be used for locking the steering wheels, brakes, gearshifts, hand brakes and ignition locks in various motor vehicles 70.

OPERATION OF THE INVENTION

Figure 2:
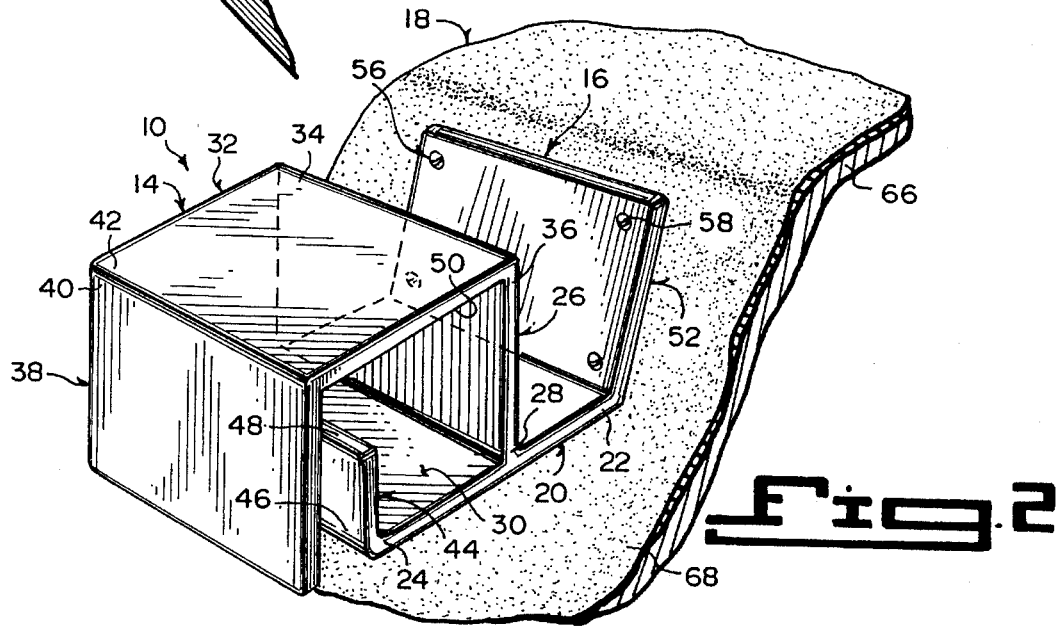
FIG. 2 is an enlarged perspective view, showing the instant invention installed to one side of the transmission hump on the floor carpet.

To use the storage rack 10 for the automotive anti-theft device 12, the following steps should be taken:

1. Place the mounting plate 52 against the stationary surface 18, so that the framework 14 can be horizontally positioned on one side of a transmission hump 66 on a floor carpet 68 in a motor vehicle 70, as shown in FIGS. 1, 2 and 3 or vertically positioned on an interior side panel 72 of the motor vehicle 70, as shown in FIG. 4.

2. Insert the screws 58 through the holes 54 in the mounting plate 52.

3. Thread the screws 58 into the stationary surface 18, to retain the mounting plate 52 with the framework 14 thereto.

4. Maneuver the automotive anti-theft device 12 into the framework 14, so as to go into the area between the first panel 20, the second panel 26, the third panel 32 and the fifth panel 44.

5. Take the automotive anti-theft device 12 out of the framework 14, so that it can be utilized to prevent theft of the motor vehicle 70, when the motor vehicle 70 is parked and not being used.

LIST OF REFERENCE NUMBERS 10 storage rack
10a modified storage rack
12 automotive anti-theft device
14 framework
14a modified framework
16 retaining structure
16a modified retaining structure
18 stationary surface
20 first panel of 14
22 first end of 20
24 second end of 20
26 second panel of 14
28 first end of 26
30 side of 20
32 third panel of 14
34 first end of 32
36 second end of 26
38 fourth panel of 14
40 first end of 38
42 second end of 32
44 fifth panel of 14
46 first end of 44
48 second end of 44
50 side of 32
52 mounting plate of 16
54 hole in 52
56 fastener for 54
58 screw for 56
60 strong durable material of 14
62 thin gauge metal for 60
64 elastic substance coated on 62
66 transmission hump
68 floor carpet on 66
70 motor vehicle
72 interior side panel of 70
74 first panel of 14a
76 second panel of 14a
78 first end of 76
80 first end of 74
82 third panel of 14a
84 first end of 82
86 second end of 76
88 fourth panel of 14a
90 first end of 88
92 second end of 82
94 fifth panel of 14a
96 first end of 94
98 second end of 88
100 sixth panel of 14a
102 first end of 100
104 second end of 94
106 seventh panel of 14a
108 first end of 106
110 second end of 100
112 eighth panel of 14a
114 first end of 112
116 second end of 106
118 second end of 112
120 side of 82
122 hole in 94
124 fastener for 122
126 screw for 124

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A storage rack for an automotive anti-theft device comprising:
   a) a framework for holding the automotive anti-theft device, said framework including a first panel having a first end and a second end, a second panel depending at a right angle on its first end from a side of said first panel midway between said first end and said second end of said first panel, a third panel supported at a right angle on its first end from a second end of said second panel, said third panel being of a length longer than half the length of said first panel and extending parallel to said first panel, a fourth panel extending at a right angle on its first end from a second end of said third panel, said fourth panel being of equal length to said second panel and extending parallel to said second panel, and a fifth panel projecting at a right angle on its first end from said second end of said first panel, said fifth panel being of a length shorter than said second panel and said fourth panel and extending parallel to and between said second panel and said fourth panel, thereby leaving a clearance space between a second end of said fifth panel and a side of said third panel, to allow the automotive anti-theft device to be inserted therein; and
   b) means for retaining said framework to a stationary surface, to prevent movement of the automotive anti-theft device.

2. A storage rack for an automotive anti-theft device as recited in claim 1, wherein said retaining means includes:
   a) a mounting plate angularly affixed to said framework, said mounting plate having a plurality of holes therethrough; and
   b) a plurality of fasteners, each said fastener extends through one said hole, respectively, in said mounting plate and into the stationary surface, so as to secure said mounting plate with said framework to the stationary surface.

3. A storage rack for an automotive anti-theft device as recited in claim 2, wherein each said fastener is a screw.

4. A storage rack for an automotive anti-theft device as recited in claim 3, wherein said framework is fabricated out of a strong durable material.

5. A storage rack for an automotive anti-theft device as recited in claim 4, wherein said framework is made out of a thin gauge metal.

6. A storage rack for an automotive anti-theft device as recited in claim 5, wherein said framework is coated with an elastic substance, to prevent harm to both a person and the automotive anti-theft device.

7. A storage rack for an automotive anti-theft device as recited in claim 6, wherein said retaining means is made out of a thin gauge metal substance.

8. A storage rack for an automotive anti-theft device as recited in claim 7, wherein said retaining means is coated with an elastic substance, to prevent harm to both a person and the automotive anti-theft device.

9. A storage rack for an automotive anti-theft device as recited in claim 8, wherein said first panel, said second panel, said third panel, said fourth panel, said fifth panel and said mounting plate are integral to each other and are of the same width, so as to form one complete whole unit.

* * * * *